Patented Apr. 11, 1950

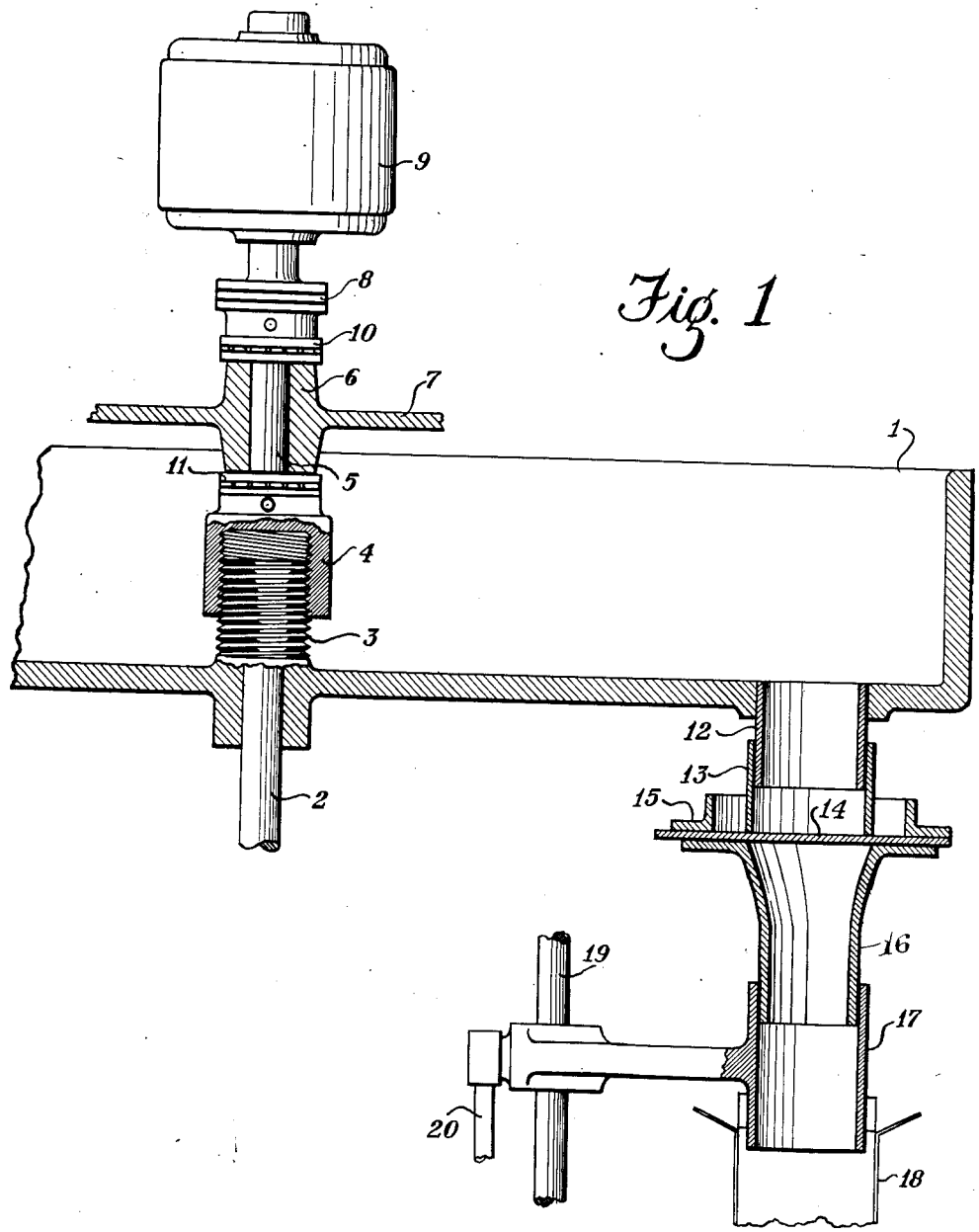

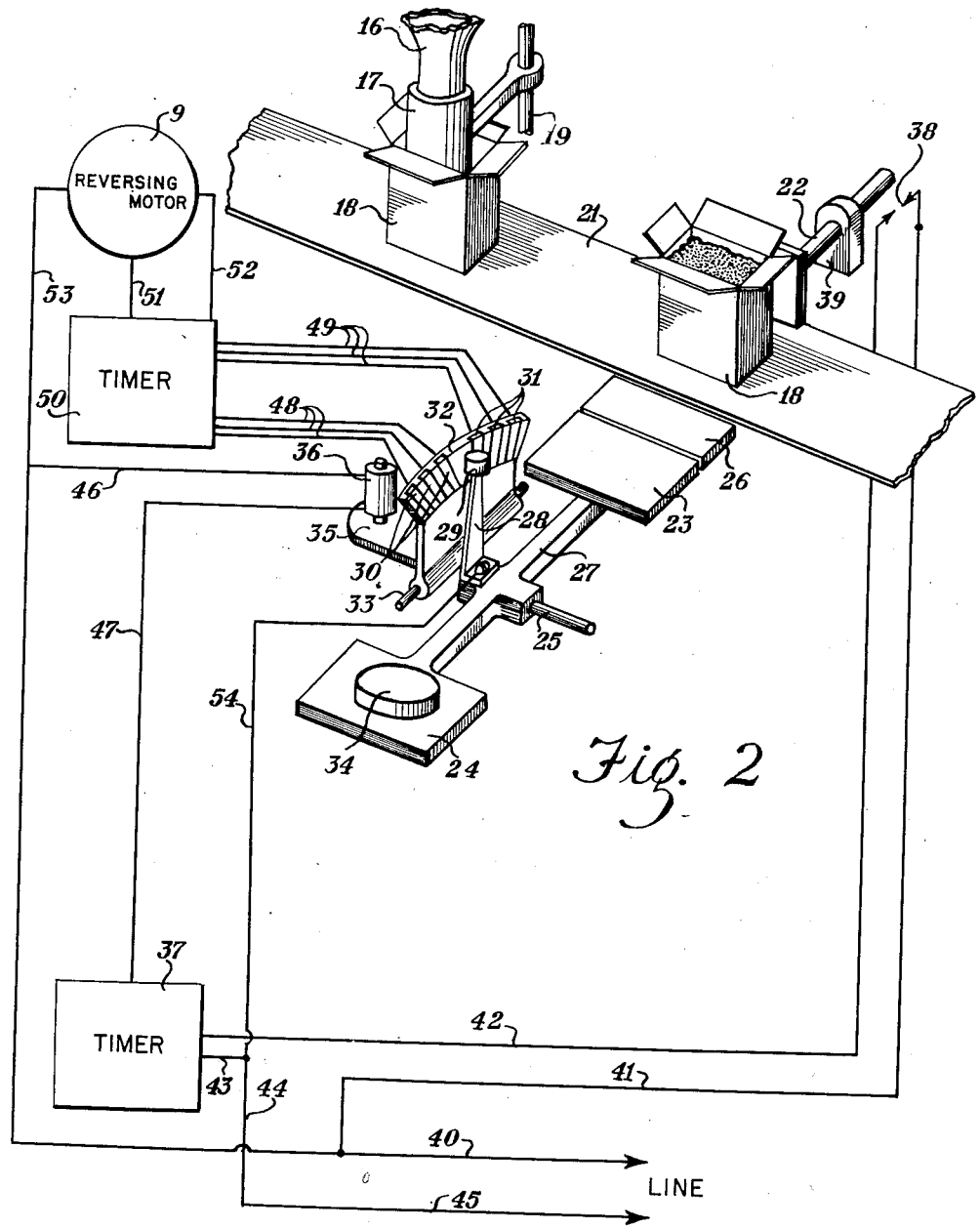

2,503,295

UNITED STATES PATENT OFFICE 2,503,295

WEIGHT CONTROLLED VOLUMETRIC FILLING MECHANISM

Charles E. Palmer, Chicago, Ill., assignor to Frank D. Palmer, Incorporated, a corporation of Illinois Application November 13, 1945, Serial No. 628,232

7 Claims. (Cl. 249—2)

This invention relates to packaging machinery and more particularly to measuring equipment constituting a part of a packaging machine for measuring out a selected amount of material for introduction into a package or container.

Material measuring devices of the character indicated are of course quite well known in the art, and many of the devices known are of an adjustable character so that the amount of material to be delivered may be varied within certain limits. The variation provided is usually for the purpose of insuring the delivery of an accurately measured quantity of material rather than for the purpose of providing substantial changes in the quantity to be delivered, although in some cases the latter is also the purpose of providing an adjustable measuring means.

Material measuring mechanism shown in Palmer Patent No. 2,309,209, issued January 26, 1943, represents one form of measuring mechanism. Such mechanisms are generally characterized as volumetric filling devices in that they determine the amount of material to be delivered by volume rather than by weight. Most foodstuffs, and many other preparations, are required to be packaged so as to contain a specified weight of material. It is, of course, possible to relate the weight of material to the volume thereof and, as a practical matter, such materials have heretofore been packaged by measuring a volume of material which should normally weigh the required amount.

In the practical art of large volume packaging of various materials, the weight of the filled packages is checked by more or less periodically selecting from the line of filled packages a single package and weighing it on a scale. Any correction in the amount of material which the checking operation indicates to be necessary, is then manually effected. The manual adjustment of the capacity of the measuring receptacle is more or less a matter of guess work notwithstanding the possibility of calibrating the adjusting mechanism to indicate the extent of change by a given movement of the adjusting means. This is at least partially the result of normal variation in the density and changes in other characteristics of the material being packaged.

The object of the present invention is to provide means for automatically checking the weight of a filled package at regular intervals and to automatically effect adjustment of the measuring means to correct any inaccuracy in the weight of the material delivered to the containers.

Other objects and advantages of the invention will be understood by reference to the following specification and accompanying drawings (two sheets) wherein there is illustrated the elements of a selected embodiment of the invention.

In the drawings, Fig. 1 is a cross sectional view illustrating the principal details of the material measuring means and the arrangement whereby its capacity is adjustable;

Fig. 2 is a perspective illustrating more or less diagrammatically the means for periodically checking the weight of the filled packages, and for initiating appropriate adjustment of the filling means.

The mechanism illustrated in Fig. 1 is of the general character of the corresponding mechanism shown in the above-mentioned Palmer patent. It comprises a hopper or pan 1 which is vertically adjustably mounted on a centrally disposed shaft 2. At its center, the pan 1 has an upwardly projecting externally threaded hub 3 which threads into a screw threaded socket 4 which is secured to a motor driven shaft 5. The shaft 5 is journalled in a bearing 6 provided in a normally stationary frame part 7 and it is connected through the agency of a flexible coupling 8 to a reversible electric motor 9. Thrust bearings 10 and 11 are provided on opposite ends of the bearings 6 for engagement with the adjacent end of the hub of the flexible coupling 8 and of the socket 4 respectively, the shaft 5 being thereby freely rotatable in its bearing while being held against longitudinal shifting.

It will be seen that when the motor is energized, the shaft 5 and socket 4 will be rotated in one direction or the other to thereby effect corresponding upward or downward adjustment of the pan 1.

Powdered, granulated or flaky material or the like is discharged from the pan 1 through a depending spout 12. The spout 12 together with a sleeve 13 and a valve plate 14 constitute a measuring receptacle which determines the volume of material to be delivered to a container. Scraping devices are provided within the pan 1 for moving material in the pan across its bottom and into the measuring chamber, the scraping devices being stationary if the pan 1 is rotatable as in the above-mentioned Palmer patent, or rotatable if the pan is non-rotatable. The scraping means being known in the art is not herein shown.

The bottom plate or valve plate 14 is carried by a frame 15 which is laterally movable. The plate 14 is of somewhat elongated form and is provided near one end with an opening which, when brought into alignment with the measuring chamber will permit the material therein to drop out of the chamber into a spout 16 and a vertically movable spout extension 17 and thence into a container 18. The means for shifting the valve plate 14 back and forth may be similar to that shown in the said Palmer patent and, forming no part of the present invention, is not herein illustrated. The spout member 17 is vertically slidably mounted on a guide rod 19 and it may be caused to reciprocate by a suitable connection 20 to cam or other means for operating the spout member in the desired timed relation to the delivery and removal of containers from filling position. It is preferable that the spout 17 is under the upper portion of the container, as shown in Fig. 1, to avoid spilling of material outside of the container.

By moving the pan 1 up or down, the total height of the column of material received within the spout 12 and sleeve 13 will, of course, be changed to thereby alter the volume of material measured by said measuring means.

As represented in Fig. 2, containers 18 are delivered into filling relationship to the spout part 17 by means of a conveyor belt 21. At a suitable point beyond the filling point, there is provided a plunger 22 which is suitably actuated at predetermined intervals so that it will engage and force a package from the conveyor 21 to a platform 23 at predetermined intervals. The intervals may be such that every tenth or every twentieth package, or any other selection of packages, will be discharged from the conveyor belt to the platform 23. The platform 23 constitutes one of the platforms of a balance scale, the other platform of which is indicated at 24 and the fulcrum for which is indicated at 25. The table element 26 may be provided intermediate the conveyor belt 21 and the platform 23 if it is desired to space the platform 23 substantially from the edge of the conveyor 21. The platforms 23 and 24 are connected by means of a rigid arm 27 and an upstanding arm 28 is provided, the arm 28 being similar to the usual pointer of a balance scale. At the upper end of the arm 28 there is provided an electrical contact member 29.

The contact member 29 is adapted to engage any one of two series 30 and 31 of electrical contact segments in a member 32. The member 32 is mounted for rocking movement on a pivot or fulcrum 33 so that the plane of the surfaces of the contact segments 30 and 31 may be moved to and from the contact 29. Normally the member 32 is spaced from the contact 29 so that the balance scale may freely adjust itself in accordance with the weight of a package delivered to the platform 23. A counterweight, such as indicated at 34, may be placed on the platform 24, the counterweight being of course the required minimum weight of the filled package.

The member 32 is provided with a laterally extending arm 35 which may be made of iron or equipped with an iron insert so as to be capable of being actuated by an electromagnet 36. When the magnet 36 is energized, the armature 32 will be rocked to move the contact segments 30 or 31 into position for engagement with the contact element 29.

When a package is delivered to the platform 23, the arm 27 will be caused to rock somewhat; that is to say, it will not immediately come to a stationary position but will usually waver up and down somewhat in the manner of the ordinary balance scale. To permit freedom of movement of the balance arm and to delay electrical contact between the contact element 29 and contact segments 30 or 31, there is provided a timer 37 connected in the electric circuit to the magnet 36. The timer is controlled by an electric circuit which includes a switch 38 which is adapted to be closed by being engaged by a lug 39 or the like, carried by the plunger 22 when it is moved forwardly sufficiently to deliver a filled package to the scale platform 23. When the package is delivered to the platform 23, the switch 38 is closed so that a circuit will flow through the electrical conductor line indicated at 40, the branch line 41, through the switch 38, and the line 42, to the timer and thence through the lines 43 and 44 to the other side 45 of the power source. The timer being thus energized and being of a known construction will, after the lapse of a predetermined interval, effect energization of the magnet 36, the circuit flowing then from the line 40 through the branch 46 to the magnet and thence through the line 47 through the timer and from the timer through the lines 43 and 44 back to the power source 45.

The time interval at which the timer 37 is set will be such that it will allow the passage of the time required for substantial settling of the balance arm 27 and its contact carrying arm 28. The contact element 29 will thereby be brought into engagement with one of the contact elements 30 or 31, depending upon the shortage or excess of weight of the filled package over the required minimum weight. The contact segments 30 and 31 are respectively connected by electrical lines indicated at 48 and 49 to a timer 50 which has connections 51 and 52 with a reversing electric motor 9.

Assuming, for example, that the contact element 29 is caused to engage one of the contact segments 30, the circuit will then be through the lines 40 and 53 to the reversing motor 9 and from the reversing motor through the line 51 (or 52) through the timer and one of the lines 48 to its segment 30 and through the contact element 29 and arm 28 to the line 54 and back to the other side 45 of the source of power. The timer 50 serves to regulate the time period for which the reversing motor 9 will remain energized, the time period being dependent upon which of the segments 30 (or 31) is contacted by the contact element 29. The greater the variation in the weight of the filled package from the predetermined standard, the greater will be the time period for which the reversing motor 9 is energized.

In the arrangement shown, if the package is overweight contact will be made between the contact element 29 and one of the commutator segments 31, through the timer and one of the lines 51 or 52 to cause the motor 9 to rotate in the proper direction to reduce the capacity of the measuring means comprising the spout 12 and sleeve 13. Similarly, if the package is underweight the contact element 29 will engage one of the segments 30 to cause the motor 9 to rotate in the other direction so as to increase the capacity of the said measuring means.

By the described arrangement, the filled packages may be checked automatically at frequently recurring intervals of any desired selection and appropriate adjustment automatically made in the capacity of the measuring means. In some cases, when the characteristics of the material being packaged vary considerably as the material is being delivered to the receiving pan 1, the motor 9 may be caused to operate with such frequency that the pan 1 will hardly have time to remain stationary but will be of a more or less floating character in that it will be constantly adjusted up or down as the characteristics of the material vary. If the characteristics of the material are quite constant, the motor 9 will perhaps be seldom energized and there will be but little adjustment effected of the capacity of the measuring means.

In the illustrated arrangement, only three commutator segments 30 and three commutator segments 31 are illustrated, this illustration being merely exemplary. The number of segments on each side of the commutator may, of course, be increased considerably depending upon the closeness of adjustment it is desired to effect by the automatic means described. The greater the number of segments, the smaller the increments of time represented by each additional segment.

Various changes may be made in the described arrangement without departing from the spirit of the invention.

I claim:

1. In apparatus of the class described, the combination of an adjustable capacity measuring receptacle arranged to deliver a quantity of material measured thereby to a container, weighing means for receiving the filled container to check the filled weight thereof, means controlled by said weighing means for effecting adjustment of said measuring receptacle to change its capacity to cause it to deliver a measured volume of material having a weight within a predetermined narrow range of limits, and timing means for effecting operative connection of said weighing means with said adjusting means after the passage of a predetermined time interval from the delivery of a filled container to said weighing means, whereby said weighing means will have time to settle before initiating adjustment of said measuring receptacle.

2. In apparatus of the class described, the combination of an adjustable capacity measuring receptacle arranged to deliver a quantity of material measured thereby to a container, weighing means for receiving the filled container to check the filled weight thereof, an electric motor connected to said measuring receptacle for effecting adjustment of the capacity thereof, and electrical connections between said weighing means and said motor for closing a circuit to energize the motor, said connections including a timer for causing said motor to be energized for varying time periods dependent upon the extent of variation from a predetermined standard of the filled container weight determined by said weighing means.

3. In apparatus of the class described, the combination of an adjustable capacity measuring receptacle arranged to deliver a quantity of material measured thereby to a container, weighing means for receiving the filled container to check the filled weight thereof, a reversing electric motor connected to said measuring receptacle for effecting adjustment of the capacity thereof, said weighing means having a contact element movable in opposite directions in accordance with the variation of the filled container weight from a predetermined standard, a member having a pair of contact segments respectively adapted to be engaged by said contact element when the filled container weight is above or below said standard, and electrical connections between said segments and said reversing motor to cause the motor to operate in a direction to change the capacity of said measuring receptacle in accordance with the determined variation of the filled container weight from said standard.

4. In apparatus of the class described, the combination of an adjustable capacity measuring receptacle arranged to deliver a quantity of material measured thereby to a container, weighing means for receiving the filled container to check the filled weight thereof, a reversible electric motor connected to said measuring receptacle for effecting adjustment of the capacity thereof, said weighing means having a contact element movable in opposite directions in accordance with the variation from a predetermined standard of the filled container weight determined by said weighing means, a member having two multiple contact segment sets respectively adapted to be engaged by said contact element when the filled container weight is above or below said standard, and electrical connections between said segments and said reversing motor to cause the motor to operate in a direction to change the capacity of said measuring receptacle in accordance with the determined variation of the filled container weight from standard, said connections including a timer which is set to determinate the time period of operation of said motor in accordance with the contact segment engaged by said contact element.

5. Apparatus, according to claim 4, wherein there is also provided timing means for delaying the passage of an electrical current from the contact element to any of the said segment sets until the weighing means has settled.

6. In apparatus of the class described, the combination of an adjustable capacity measuring receptacle arranged to deliver a quantity of material measured thereby to a container, electrically operated means for effecting adjustment of said measuring receptacle to change its capacity, weighing means arranged to receive the filled container, timing means controlled by said weighing means for effecting energization of said electrically operated adjusting means for varying the periods of time to thereby effect varying degrees of adjustment of said measuring receptacle in accordance with the extent of the weight variation of the filled container from a predetermined standard.

7. In apparatus of the class described, the combination of an adjustable capacity measuring receptacle arranged to deliver a quantity of material measured thereby to a container, electrically operated means for effecting adjustment of said measuring receptacle to change its capacity, weighing means arranged to receive the filled container, timing means controlled by said weighing means for effecting energization of said electrically operated adjusting means for varying the periods of time to thereby effect varying degrees of adjustment of said measuring receptacle in accordance with the extent of the weight variation of the filled container from a predetermined standard, and another timer associated with said weighing means so as to delay energization of said adjusting means during a predetermined time interval after the filled container is received by said weighing means.

CHARLES E. PALMER.

REFERENCES CITED

The following references are of record in the file of this patent:

UNITED STATES PATENTS

| Number | Name | Date |
| --- | --- | --- |
| 583,349 | Wende et al. | May 25, 1897 |
| 735,582 | Pope | Aug. 4, 1903 |
| 928,658 | Hoyt | July 20, 1909 |
| 1,484,358 | Norton | Feb. 19, 1924 |
| 2,037,484 | Raymer et al. | Apr. 14, 1936 |